United States Patent [19]

Svedoff

[11] Patent Number: 5,684,379
[45] Date of Patent: Nov. 4, 1997

[54] DEVICE AND PROCEDURE FOR RECHARGING ELECTRIC VEHICLES

[75] Inventor: Göran Svedoff, Billdal, Sweden

[73] Assignee: AB Volvo, Gothenburg, Sweden

[21] Appl. No.: 413,682

[22] Filed: Mar. 30, 1995

[30] Foreign Application Priority Data

Sep. 30, 1992 [SE] Sweden .................................. 9202823

[51] Int. Cl.[6] .................................................. H02M 10/44
[52] U.S. Cl. ............................................ 320/2; 364/492
[58] Field of Search ........................... 320/2, 13, 48, 320/21; 364/492, 483

[56] References Cited

U.S. PATENT DOCUMENTS

| | | | |
|---|---|---|---|
| 3,904,948 | 9/1975 | Earle | 320/13 |
| 4,199,100 | 4/1980 | Wostl et al. | 235/381 |
| 4,317,049 | 2/1982 | Schweppe | 307/39 |
| 4,349,879 | 9/1982 | Peddie et al. | 364/492 |
| 4,532,418 | 7/1985 | Meese et al. | 235/381 |
| 5,157,319 | 10/1992 | Klontz et al. | 320/2 |
| 5,257,190 | 10/1993 | Crane | 364/424.03 |
| 5,349,535 | 9/1994 | Gupta | 364/483 |

FOREIGN PATENT DOCUMENTS 0015666   9/1980   European Pat. Off. ........... H02J 3/14

*Primary Examiner*—Peter S. Wong
*Assistant Examiner*—Gregory J. Toatley, Jr.
*Attorney, Agent, or Firm*—Klarquist Sparkman Campbell Leigh & Whinston, LLP

[57] ABSTRACT

A device and a procedure for recharging of a electric vehicle's (25) energy storage units (20, 21). The device includes a charging unit (15) for conversion of mains distributed electrical energy to an for the vehicle's storage units adapted electrical energy. The device also includes means (17) for measuring features of the mains distributed electrical energy, means (18) to detect recharging needs in the vehicle storage units (20, 21) and a control unit (16) for controlling the charging unit (15), which is dependent on input data from the measuring means (17) and the detecting means (18). Owing to that the mains distributed electrical energy's features are measured, that the recharging needs in the vehicle storage units (20, 21) are detected and that the recharging is directed dependent on input data from the measuring means (17) and detecting means (18), the recharging process can be adapted to the features of the available electric power and to charging requirements in the vehicle storage units.

12 Claims, 1 Drawing Sheet

5,684,379

DEVICE AND PROCEDURE FOR RECHARGING ELECTRIC VEHICLES

CROSS-REFERENCE TO RELATED CASE

This is a continuation of PCT Application No. PCT/SE93/00780 filed Sep. 29, 1993, which was pending at the time the U.S. national application was filed.

TECHNICAL AREA

The present invention refers to a vehicle energy recharging system for two or more energy storage units in an electric vehicle, comprising a charging unit for conversion of mains distributed electrical energy to energy which is adapted to said vehicle storage units. The invention also refers to a method for recharging two or more energy storage units in an electric vehicle, said method comprising conversion of mains distributed electrical energy to an electrical energy adapted to the vehicle energy storage units.

BACKGROUND OF THE INVENTION

A electric vehicle is provided with rechargeable batteries that need regular recharging with electrical energy. Besides energy is needed for the vehicle's support apparatuses, for example climate system and temperature control of batteries.

The number of electric vehicles in the traffic will increase and this implies an increased load onto the electric distribution mains in the long run. A problem in connection to this, is that more electrical energy is consumed during the cold period of the year to recharge a electric vehicle, when at the same time the electricity consumption for heating of households is high. It is therefore desirable that the distribution of energy for recharging electric vehicles is done in such a way that said load is optimized.

From a international point of view, it is desirable that an electric vehicle shall be capable of being recharged with different occurring current variations, for example with a voltage from a single-phase of 100 volt to a three-phase of 415 volt and with frequencies of 50 Hz up to 60 Hz. Besides, function disturbances that influences the loading, for example phase disappearance and power intermission, should be minimized. Further, an extended recharging period with lower current can give the batteries of an electric vehicle added life.

THE PURPOSE AND MOST IMPORTANT FEATURES OF THE INVENTION

The purpose of the present invention is therefor to achieve a device for recharging vehicles, for example electric vehicles that fulfil the above given needs.

For this purpose, the device according to the invention is characterized in; means for detecting and measuring the features of the mains distributed electrical energy, means for detection of recharging needs in the different storage units of the vehicle, and a control unit for controlling the charging unit, said control unit being adeptable to input data from the measuring means and the detecting means, for adapting the recharging process to the individual requirements of each respective energy storage unit of the vehicle. By means of this design of the device, electric vehicles can be recharged anywhere in the world and make good use of the available effect of the electric mains for an optimal utilization. Further the electric distributor can deliver its current with a more uniform power-distribution over twenty-four hours.

SHORT DESCRIPTION OF THE DRAWINGS

The invention will be described herebelow with reference to the embodiment that is shown in the enclosed drawings, in which:

FIG. 1 shows a device according to the invention schematically as a block diagram, and FIG. 2 shows a distribution system for electrical energy in a corresponding way.

DESCRIPTION OF EMBODIMENT

Figure 1:
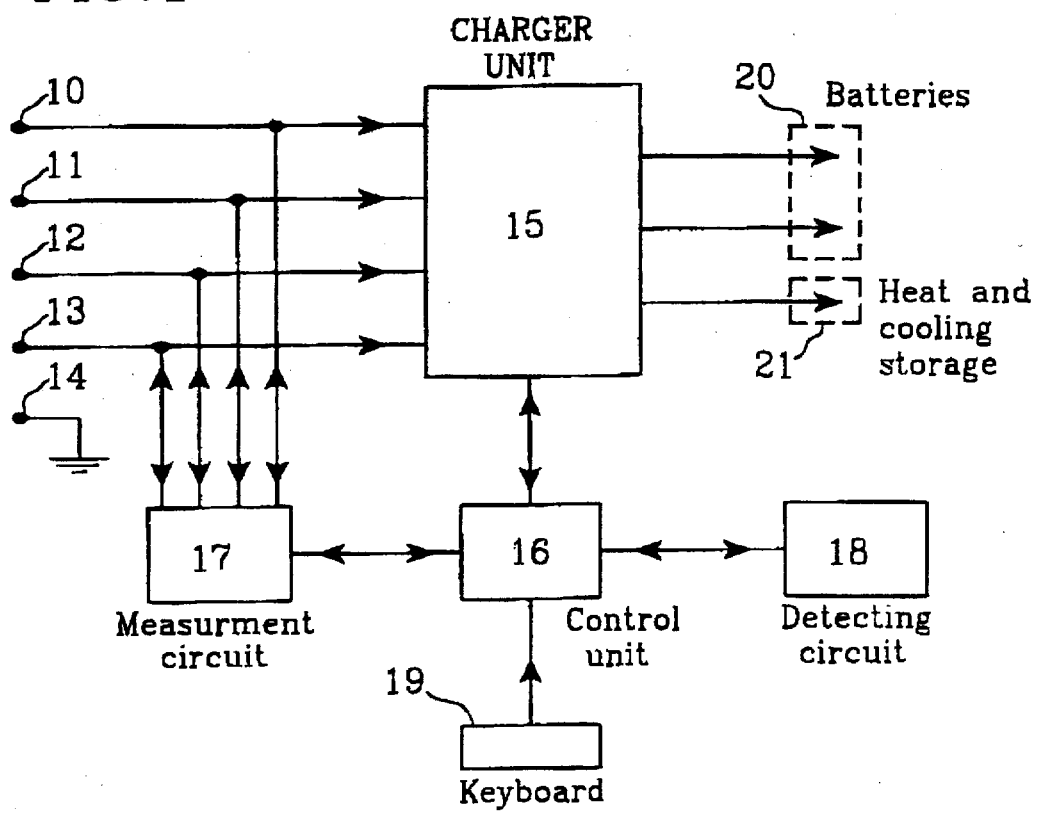

In FIG. 1 the reference numerals 10, 11 and 12 indicate the three phases in a distribution mains for three-phase alternating current, while 13 and 14 indicate the zero and ground of the mains respectively. These conductors are in a conventional way parts in a common cable that is connectable by means of suitable connector means to a built-in charging unit 15 in a non shown electric vehicle, which charging unit is suitably constructed by switch-technique and is controlled by a control circuit 16.

The control unit 16 is connected to a measurement circuit 17 which among other things senses the voltage in the different phases 10–12 and sends its measured data to the control unit 16, which in its turn regulates the charging unit 15, so that accessible energy is utilized optimally without overload of the power mains. Suitably, the measurement circuit 17 also includes a transmitter and a receiver for communication via the power mains according to known technique.

The control unit 16 is also connected to a detecting circuit 18, which via electronics in the vehicle senses the requirements in the vehicle loads, for example batteries, heat storage, cooling storage or other support apparatuses, whereby the charging process can be optimized via the control unit with regard to input data from the detecting circuit 18.

A keyboard 19, which is connected to the control unit 16, can be used to enter data manually, for instance regarding the power mains capacity, the nominal current of the fuse, available effect at different times a day. Besides the keyboard can be used for input of data regarding date for the next use of the vehicle, whereby the battery recharge can be controlled so that the best charge status of the batteries 20 and eventual heat- and cooling storage 21 are achieved just before the vehicle shall be used. In this way losses in the storage units can be avoided.

The above described device can be complemented by providing a nearby house with a local load detector on the power mains, which sends data about available electric energy (deducted from main fuses) to the measurement transmitter and receiver of the circuit 17.

Figure 2:
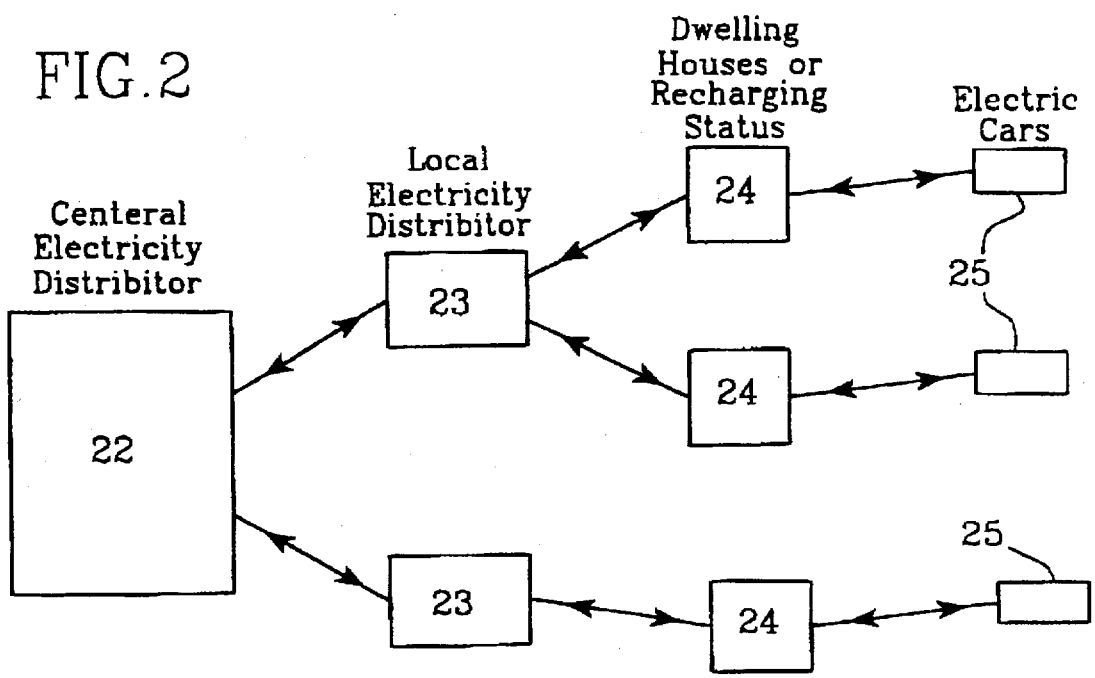

The communication via the power mains can also be utilized in such a way that the electricity distributor announce accessible effect both central and local, which is illustrated in FIG. 2 where the reference numeral 22 indicates one central electricity distributor, 23 local electricity distributors, 24 dwelling-houses or recharging stations and 25 electric cars that are connected. With this form of distribution, a favourable uniform load on a power-plant can be achieved over twenty-four hours. With gathered information from several different electric vehicles priorities can also be given with reference the individual needs. This can be developed very far with information from vehicle drivers, on for example driving distances and starting time. Further, input data from the circuit 18 can also be included, for example about the cars normal driving cycle, time and date.

As the vehicle can send information regarding its need and thereby indicating its identity, it can also be connected to a debit system for the energy bought.

Above said system can be extended so that a vehicle can receive an energy increase in principle by each parking occasion. The existing power mains only needs to be changed in an relatively small extent.

The invention is not limited to the above described embodiments, instead more variants are conceivable within the scoop of following claims.

I claim:

1. A vehicle energy recharging system for recharging two or more energy storage units in an electric vehicle, comprising:

a charging unit for conversion of mains distributed electric energy to energy which is adapted to recharge the energy storage units;

a measurement circuit for measuring the mains distributed electric energy and providing a measurement output;

a detecting circuit for sensing the requirements in the energy storage units and providing a detection output;

a control unit for controlling the charging unit;

the control unit regulating the amount of energy delivered from the charging unit to the energy storage units in response to the measurement output; and the control unit regulating the amount of energy delivered from the charging unit to the energy storage units in response to the detection output.

2. A recharging system according to claim 1, wherein the control unit includes means for manual input of data regarding the mains distributed energy.

3. A recharging system according to claim 1, wherein the mains distributed electric energy includes a plurality of phases and wherein the measuring circuit includes a transmitter and a receiver for reception of information regarding available electric power and distribution between the respective phases.

4. A method for recharging two or more energy storage units in an electric vehicle, comprising conversion of mains distributed electrical energy to an electrical energy adapted to the vehicle energy storage units, and comprizing the steps of measuring features of the mains distributed electrical energy, detecting the individual recharging needs of the energy storage units of the vehicle, and controlling the charging in dependence to input data from measuring means and detecting means, in such a way that the charging process is adapted to the individual requirements of each respective energy storage unit of the vehicle.

5. A method according to claim 4, wherein the recharging of the vehicle is adapted to data regarding driving cycles, time of day, day of the week and date.

6. A method according to claim 4, wherein the recharging process is optimized with regard to the time-span to the next using-occasion and driving-distance/stop-time of the vehicle.

7. A method according to claim 6, wherein data regarding the vehicle's approximated energy requirements are sent to the measuring device, which by means of two-way communication via the electric mains responds with data about the appropriate power outlet, based on other local input data.

8. A method according to claim 7, wherein several sockets placed in a local group, and several vehicles within this group, share the local electrical energy available for the group with individual needs priority.

9. A method according to claim 8, wherein data regarding available electric energy are distributed via a central electric distributor's electric mains, for control of the recharging of the group of vehicles and for equalization of the power load on the distribution mains.

10. A method according to claim 9, wherein identification data on the individual electric vehicle are transmitted via the electric mains for determining the energy costs associated with energy used to charge the energy storage units.

11. A method according to claim 10, wherein identification data on a user of the electric vehicle are also transmitted via the electric mains for billing the user for energy costs associated with energy used and any rent for the vehicle.

12. A vehicle energy recharging system for recharging two or more energy storage units in an electric vehicle, comprising:

a charging unit for conversion of energy received from a mains distributed electric energy source to energy which is adapted to recharge the energy storage units;

a measurement circuit for measuring the mains distributed electric energy and providing a measurement output;

a detecting circuit for sensing the requirements in the energy storage units in the vehicle and providing a detection output;

a control unit for controlling the charging unit;

the control unit regulating the amount of energy delivered from the charging unit to the energy storage units in response to the measurement output;

the control unit regulating the amount of energy delivered from the charging unit to the energy storage units in response to the detection output;

the measurement circuit including a transmitter for transmitting identification data to the main distributed electric energy source that identifies the vehicle being recharged; and the measurement circuit further adapted to transmit requirements data regarding the vehicle's approximated energy requirements to the main distributed electric energy source.

* * * * *